US009542864B2

(12) United States Patent
Fischer

(10) Patent No.: US 9,542,864 B2
(45) Date of Patent: *Jan. 10, 2017

(54) METHODS AND APPARATUS FOR DIGITAL STEGANOGRAPHY

(71) Applicant: salesforce.com, inc., San Francisco, CA (US)

(72) Inventor: Ronald Fischer, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,720

(22) Filed: Mar. 30, 2015

(65) Prior Publication Data
US 2015/0206459 A1 Jul. 23, 2015

Related U.S. Application Data

(63) Continuation of application No. 13/467,557, filed on May 9, 2012, now Pat. No. 9,015,494.

(60) Provisional application No. 61/506,439, filed on Jul. 11, 2011.

(51) Int. Cl.
G09C 5/00 (2006.01)
G06F 21/60 (2013.01)

(52) U.S. Cl.
CPC ............... G09C 5/00 (2013.01); G06F 21/60 (2013.01)

(58) Field of Classification Search
CPC ............ G09C 5/00; H03M 5/00; H04K 1/00; H04K 1/02; H04K 1/10; H04L 9/00; H04L 9/34; H04L 2209/16
See application file for complete search history.

(56) References Cited

U.S. PATENT DOCUMENTS

| 5,577,188 | A | | 11/1996 | Zhu | 395/326 |
|---|---|---|---|---|---|
| 5,608,872 | A | | 3/1997 | Schwartz et al. | 395/200.04 |
| 5,649,104 | A | | 7/1997 | Carleton et al. | 395/200.04 |
| 5,715,450 | A | | 2/1998 | Ambrose et al. | 395/614 |
| 5,761,419 | A | | 6/1998 | Schwartz et al. | 395/200.34 |
| 5,819,038 | A | | 10/1998 | Carleton et al. | 395/200.34 |
| 5,821,937 | A | | 10/1998 | Tonelli et al. | 345/356 |
| 5,831,610 | A | | 11/1998 | Tonelli et al. | 345/335 |
| 5,873,096 | A | | 2/1999 | Lim et al. | 707/201 |
| 5,918,159 | A | | 6/1999 | Fomukong et al. | 455/38.1 |
| 5,963,953 | A | | 10/1999 | Cram et al. | 707/102 |
| 6,055,321 | A | * | 4/2000 | Numao et al. | 382/100 |
| 6,092,083 | A | | 7/2000 | Brodersen et al. | 707/201 |
| 6,161,149 | A | | 12/2000 | Achacoso et al. | 710/4 |
| 6,169,534 | B1 | | 1/2001 | Raffel et al. | 345/133 |
| 6,178,425 | B1 | | 1/2001 | Brodersen et al. | 707/101 |
| 6,189,011 | B1 | | 2/2001 | Lim et al. | 707/102 |
| 6,216,135 | B1 | | 4/2001 | Brodersen et al. | 707/201 |
| 6,233,617 | B1 | | 5/2001 | Rothwein et al. | 709/227 |
| 6,266,669 | B1 | | 7/2001 | Brodersen et al. | 707/10 |
| 6,295,530 | B1 | | 9/2001 | Ritchie et al. | 707/4 |
| 6,324,568 | B1 | | 11/2001 | Diec et al. | 709/203 |
| 6,324,693 | B1 | | 11/2001 | Brodersen et al. | 717/11 |
| 6,336,137 | B1 | | 1/2002 | Lee et al. | 709/219 |
| D454,139 | S | | 3/2002 | Feldcamp | D14/486 |
| 6,367,077 | B1 | | 4/2002 | Brodersen et al. | 717/170 |
| 6,393,605 | B1 | | 5/2002 | Loomans | 717/121 |
| 6,405,220 | B1 | | 6/2002 | Brodersen et al. | 707/202 |
| 6,434,550 | B1 | | 8/2002 | Warner et al. | 707/3 |
| 6,446,089 | B1 | | 9/2002 | Brodersen et al. | 707/201 |
| 6,535,909 | B1 | | 3/2003 | Rust | 709/204 |
| 6,549,908 | B1 | | 4/2003 | Loomans | 707/101 |
| 6,553,563 | B2 | | 4/2003 | Ambrose et al. | 717/116 |
| 6,560,461 | B1 | | 5/2003 | Fomukong et al. | 455/456 |
| 6,574,635 | B2 | | 6/2003 | Stauber et al. | 707/103 R |
| 6,577,726 | B1 | | 6/2003 | Huang et al. | 379/265.02 |
| 6,601,087 | B1 | | 7/2003 | Zhu et al. | 709/205 |
| 6,604,117 | B2 | | 8/2003 | Lim et al. | 707/200 |
| 6,604,128 | B2 | | 8/2003 | Diec | 709/203 |
| 6,609,150 | B2 | | 8/2003 | Lee et al. | 709/219 |
| 6,621,834 | B1 | | 9/2003 | Scherpbier et al. | 370/532 |
| 6,654,032 | B1 | | 11/2003 | Zhu et al. | 345/753 |
| 6,665,648 | B2 | | 12/2003 | Brodersen et al. | 705/7 |
| 6,665,655 | B1 | | 12/2003 | Warner et al. | 707/2 |
| 6,684,438 | B2 | | 2/2004 | Brodersen et al. | 707/201 |
| 6,711,565 | B1 | | 3/2004 | Subramaniam et al. | 707/3 |
| 6,724,399 | B1 | | 4/2004 | Katchour et al. | 345/740 |
| 6,728,702 | B1 | | 4/2004 | Subramaniam et al. | 707/3 |
| 6,728,960 | B1 | | 4/2004 | Loomans | 718/102 |
| 6,732,095 | B1 | | 5/2004 | Warshavsky et al. | 707/5 |
| 6,732,100 | B1 | | 5/2004 | Brodersen et al. | 707/9 |
| 6,732,111 | B2 | | 5/2004 | Brodersen et al. | 707/101 |
| 6,754,681 | B2 | | 6/2004 | Brodersen et al. | 707/202 |
| 6,763,351 | B1 | | 7/2004 | Subramaniam et al. | 707/3 |
| 6,763,501 | B1 | | 7/2004 | Zhu et al. | 715/530 |
| 6,768,904 | B2 | | 7/2004 | Kim | 455/414 |
| 6,772,229 | B1 | | 8/2004 | Achacoso et al. | 710/4 |
| 6,782,383 | B2 | | 8/2004 | Subramaniam et al. | 707/3 |
| 6,804,330 | B1 | | 10/2004 | Jones et al. | 379/88.01 |
| 6,826,565 | B2 | | 11/2004 | Ritchie et al. | 707/4 |
| 6,826,582 | B1 | | 11/2004 | Chatterjee et al. | 707/205 |
| 6,826,745 | B2 | | 11/2004 | Coker | 717/115 |
| 6,829,655 | B1 | | 12/2004 | Huang et al. | 709/248 |
| 6,842,748 | B1 | | 1/2005 | Warner et al. | 707/2 |
| 6,850,895 | B2 | | 2/2005 | Brodersen et al. | 705/9 |
| 6,850,949 | B2 | | 2/2005 | Warner et al. | 707/101 |

(Continued)

OTHER PUBLICATIONS

USPTO, Non-final Office Action issued in U.S. Appl. No. 13/467,557, dated Sep. 26, 2013.

(Continued)

Primary Examiner — Andrew W Johns
(74) Attorney, Agent, or Firm — Lorenz & Kopf LLP

(57) ABSTRACT

A computer-implemented digital steganography method includes providing a plurality of target data elements each comprising a sequence of digital bits, providing a plurality of source data elements each comprising a sequence of digital bits and has a specific start bit, and generating, according to a predefined extraction method, a mapping of each of the target data elements with a corresponding source data element. The mapping includes, for each target data element, a corresponding indice indicating the position of the specific start bit within a bitwise representation of the source data elements irrespective of the bitwise position of each of the source data elements.

28 Claims, 4 Drawing Sheets

(56) References Cited

U.S. PATENT DOCUMENTS

| | | | |
|---|---|---|---|
| 7,062,502 B1 | 6/2006 | Kesler | 707/102 |
| 7,069,231 B1 | 6/2006 | Cinarkaya et al. | 705/10 |
| 7,181,758 B1 | 2/2007 | Chan | 725/110 |
| 7,289,976 B2 | 10/2007 | Kihneman et al. | 707/1 |
| 7,340,411 B2 | 3/2008 | Cook | 705/10 |
| 7,356,482 B2 | 4/2008 | Frankland et al. | 705/8 |
| 7,401,094 B1 | 7/2008 | Kesler | 707/102 |
| 7,412,455 B2 | 8/2008 | Dillon | 707/102 |
| 7,508,789 B2 | 3/2009 | Chan | 370/328 |
| 7,620,655 B2 | 11/2009 | Larsson et al. | 707/104.1 |
| 7,698,160 B2 | 4/2010 | Beaven et al. | 705/8 |
| 7,779,475 B2 | 8/2010 | Jakobson et al. | 726/26 |
| 8,014,943 B2 | 9/2011 | Jakobson | 701/202 |
| 8,015,495 B2 | 9/2011 | Achacoso et al. | 715/751 |
| 8,032,297 B2 | 10/2011 | Jakobson | 701/202 |
| 8,082,301 B2 | 12/2011 | Ahlgren et al. | 709/204 |
| 8,095,413 B1 | 1/2012 | Beaven | 705/7.38 |
| 8,095,594 B2 | 1/2012 | Beaven et al. | 709/204 |
| 8,209,308 B2 | 6/2012 | Rueben et al. | 707/705 |
| 8,275,836 B2 | 9/2012 | Beaven et al. | 709/204 |
| 8,457,545 B2 | 6/2013 | Chan | 455/3.01 |
| 8,484,111 B2 | 7/2013 | Frankland et al. | 705/35 |
| 8,490,025 B2 | 7/2013 | Jakobson et al. | 715/855 |
| 8,504,945 B2 | 8/2013 | Jakobson et al. | 715/855 |
| 8,510,045 B2 | 8/2013 | Rueben et al. | 710/532 |
| 8,510,664 B2 | 8/2013 | Rueben et al. | 715/752 |
| 8,566,301 B2 | 10/2013 | Rueben et al. | 707/705 |
| 8,646,103 B2 | 2/2014 | Jakobson et al. | 726/29 |
| 9,015,494 B2 * | 4/2015 | Fischer | G06F 21/60 713/189 |
| 2001/0044791 A1 | 11/2001 | Richter et al. | 707/2 |
| 2002/0072951 A1 | 6/2002 | Lee et al. | 705/10 |
| 2002/0082892 A1 | 6/2002 | Raffel et al. | 705/8 |
| 2002/0129352 A1 | 9/2002 | Brodersen et al. | 717/174 |
| 2002/0140731 A1 | 10/2002 | Subramaniam et al. | 345/762 |
| 2002/0143997 A1 | 10/2002 | Huang et al. | 709/248 |
| 2002/0162090 A1 | 10/2002 | Parnell et al. | 717/210 |
| 2002/0165742 A1 | 11/2002 | Robins | 705/7 |
| 2003/0004971 A1 | 1/2003 | Gong et al. | 707/200 |
| 2003/0018705 A1 | 1/2003 | Chen et al. | 709/202 |
| 2003/0018830 A1 | 1/2003 | Chen et al. | 709/328 |
| 2003/0066031 A1 | 4/2003 | Laane | 715/513 |
| 2003/0066032 A1 | 4/2003 | Ramachandran et al. | 715/513 |
| 2003/0069936 A1 | 4/2003 | Warner et al. | 709/206 |
| 2003/0070000 A1 | 4/2003 | Coker et al. | 709/318 |
| 2003/0070004 A1 | 4/2003 | Mukundan et al. | 709/330 |
| 2003/0070005 A1 | 4/2003 | Mukundan et al. | 709/330 |
| 2003/0074418 A1 | 4/2003 | Coker et al. | 709/217 |
| 2003/0120675 A1 | 6/2003 | Stauber et al. | 707/100 |
| 2003/0151633 A1 | 8/2003 | George et al. | 345/864 |
| 2003/0159136 A1 | 8/2003 | Huang et al. | 717/171 |
| 2003/0187921 A1 | 10/2003 | Diec et al. | 709/203 |
| 2003/0189600 A1 | 10/2003 | Gune et al. | 345/810 |
| 2003/0204427 A1 | 10/2003 | Gune et al. | 705/8 |
| 2003/0206192 A1 | 11/2003 | Chen et al. | 345/733 |
| 2003/0225730 A1 | 12/2003 | Warner et al. | 707/1 |
| 2004/0001092 A1 | 1/2004 | Rothwein et al. | 345/763 |
| 2004/0010489 A1 | 1/2004 | Rio et al. | 707/3 |
| 2004/0015981 A1 | 1/2004 | Coker et al. | 719/320 |
| 2004/0027388 A1 | 2/2004 | Berg et al. | 345/781 |
| 2004/0128001 A1 | 7/2004 | Levin et al. | 700/31 |
| 2004/0186860 A1 | 9/2004 | Lee et al. | 707/200 |
| 2004/0193510 A1 | 9/2004 | Catahan, Jr. et al. | 705/28 |
| 2004/0199489 A1 | 10/2004 | Barnes-Leon et al. | 707/1 |
| 2004/0199536 A1 | 10/2004 | Barnes Leon et al. | 707/102 |
| 2004/0199543 A1 | 10/2004 | Braud et al. | 707/104.1 |
| 2004/0249854 A1 | 12/2004 | Barnes-Leon et al. | 707/103 Y |
| 2004/0260534 A1 | 12/2004 | Pak et al. | 704/7 |
| 2004/0260659 A1 | 12/2004 | Chan et al. | 705/400 |
| 2004/0268299 A1 | 12/2004 | Lei et al. | 717/106 |
| 2005/0050555 A1 | 3/2005 | Exley et al. | 719/328 |
| 2005/0091098 A1 | 4/2005 | Brodersen et al. | 705/8 |
| 2006/0021019 A1 | 1/2006 | Hinton et al. | 726/10 |
| 2007/0194957 A1 | 8/2007 | Watanabe | 341/106 |
| 2008/0069340 A1 | 3/2008 | Vaughn | 380/28 |
| 2008/0249972 A1 | 10/2008 | Dillon | 706/46 |
| 2009/0063414 A1 | 3/2009 | White et al. | 707/3 |
| 2009/0100342 A1 | 4/2009 | Jakobson | 715/733 |
| 2009/0177744 A1 | 7/2009 | Marlow et al. | 709/204 |
| 2011/0247051 A1 | 10/2011 | Bulumulla et al. | 726/4 |
| 2012/0042218 A1 | 2/2012 | Cinarkaya et al. | 714/57 |
| 2012/0218958 A1 | 8/2012 | Rangaiah | 370/329 |
| 2012/0233137 A1 | 9/2012 | Jakobson et al. | 707/695 |
| 2013/0212497 A1 | 8/2013 | Zelenko et al. | 715/760 |
| 2013/0218948 A1 | 8/2013 | Jakobson | 709/203 |
| 2013/0218949 A1 | 8/2013 | Jakobson | 709/203 |
| 2013/0218966 A1 | 8/2013 | Jakobson | 709/204 |
| 2013/0247216 A1 | 9/2013 | Cinarkaya et al. | H04L 67/02 |

OTHER PUBLICATIONS

USPTO, Final Office Action issued in U.S. Appl. No. 13/467,557, dated Feb. 20, 2014.

USPTO, Notice of Allowance issued in U.S. Appl. No. 13/467,557, dated Dec. 12, 2014.

Anderson, R. "Why cryptosystems fail." In Preceedings of the 1st ACM conference on Computer and communications security, pp. 215-227. ACM, 1993.

Desoky, A. "Listega: list-based steganography methodology," International Journal of Information Security 8.4 (2009): 247-261.

* cited by examiner

US 9,542,864 B2

METHODS AND APPARATUS FOR DIGITAL STEGANOGRAPHY

CROSS-REFERENCE TO RELATED APPLICATION(S)

This application is a continuation of U.S. application Ser. No. 13/467,557 filed May 9, 2012, which claims the benefit of U.S. provisional patent application Ser. No. 61/506,439 filed Jul. 11, 2011, the entire contents of which are incorporated by reference herein.

TECHNICAL FIELD

Embodiments of the subject matter described herein relate generally to data security in the context of computer systems and networks. More particularly, embodiments of the subject matter described herein relate to methods of concealing data within computer files and/or data streams.

BACKGROUND

Steganography is the practice of concealing data. That is, while most branches of cryptography are focused on encrypting and decrypting messages that might be observed and analyzed by any number of individuals (i.e., not just the sender and recipient), steganography is focused on concealing even the existence of such messages.

In 16th-century France, for example, Girolamo Cardano devised a method for hiding messages within written correspondence by providing the recipient a separate sheet of paper including carefully positioned cut-outs or apertures. When properly aligned with a page of the correspondence, individual letters could be viewed through the apertures, thereby revealing the hidden message. This scheme is generally referred to as the "Cardan grille" method, owing to the grill-like appearance of the perforated sheet of paper.

In the digital era, however, steganography typically involves changing the contents of a file in a way that embeds the secret message (i.e., the "target data") but is sufficiently subtle to avoid detection. For example, the least-significant bits of digital images or sound files may be manipulated, or imperceptible delays may be added to packets sent over a network. Steganography techniques such as these are unsatisfactory in a number of respects, however, because the source dataset (i.e., the original image or file) must be altered in some way to embed the target data. In some applications, the source data cannot be modified, or modification would provide a clue that the target data was encoded therein. Accordingly, there is a need for improved systems and methods for computer-implemented steganography.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for concealing a target dataset (e.g., a password, a key, or a secret message) by applying computer-implemented digital steganography to a source dataset (e.g., a large text file or the like) while at the same time preserving the contents of the source dataset itself—i.e., without injecting data into the source dataset itself.

Figure 1:
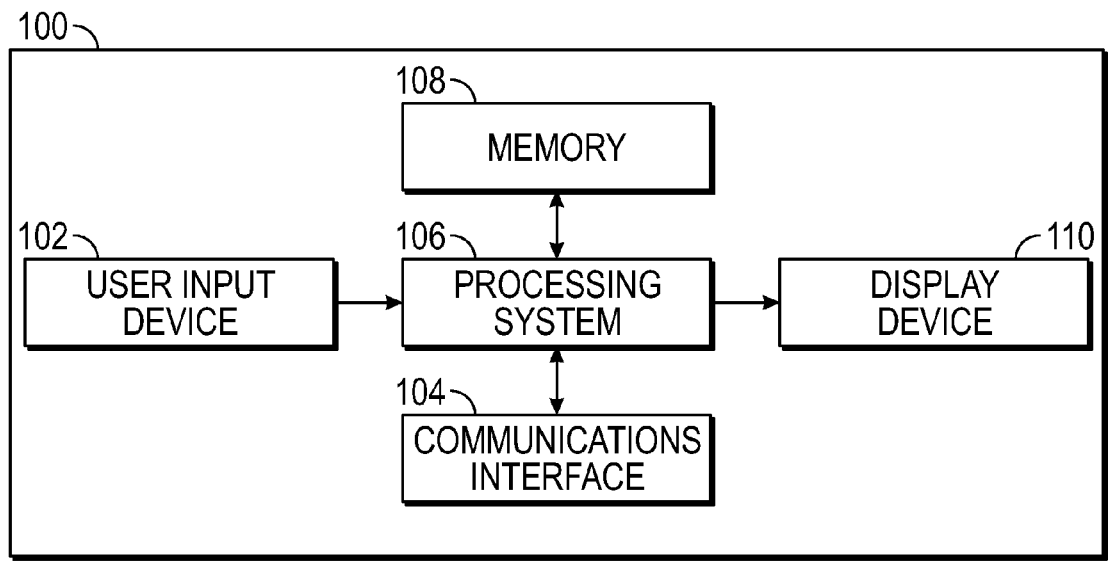
FIG. 1 is a conceptual block diagram showing an exemplary computing device.

FIG. 1 depicts an exemplary embodiment of a computing device 100 suitable for performing or otherwise supporting the processes, tasks, functions, and/or operations described herein. The computing device 100 includes, without limitation, a user input device 102, a communications interface 104, a processing system 106, a memory 108, and a display device 110. Depending on the embodiment, the computing device 100 may be realized as a server, a desktop computer, a smart-phone, a tablet computer, or any another such device. It should be understood that FIG. 1 is a simplified representation of computing device 100 and is not intended to limit the subject manner described herein in any way.

In the illustrated embodiment, user input device 102 generally represents the hardware and/or other components coupled to processing system 106 for providing a user interface to computing device 100. For example, the user input device 102 may be realize as a key pad, a keyboard, a touch panel, a touchscreen, or any other device capable of receiving input from a user. The communications interface 104 generally represents the hardware, software, firmware and/or combination thereof that are coupled to the processing system 106 and configured to transmit and/or receive data packets to and/or from the computing device 100 via a communications network, such as the Internet or another computer network. In this regard, the communications interface 104 may include one or more amplifiers, filters, modulators and/or demodulators, digital-to-analog converters (DACs), analog-to-digital converters (ADCs), antennas, or the like. In an exemplary embodiment, the display device 110 is realized as an electronic display device configured to graphically display information and/or content under control of the processing system 106.

In the computing device 100 of FIG. 1, the processing system 106 generally represents the hardware, software, firmware, processing logic, and/or other components of the processing system 106 configured to support operation of the computing device 100 and/or execute various functions and/or processing tasks described in greater detail below. Depending on the embodiment, the processing system 106 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, configured to perform the functions described herein. Furthermore, the steps of a method or algorithm described in connection with the embodiments disclosed herein may be embodied directly in hardware, in firmware, in a software module executed by processing system 106, or in any practical combination thereof. The memory 108 is coupled to the processing system 106, and the memory 108 may be realized as any non-transitory short or long term storage media capable of storing computer-executable programming instructions or other data for execution by the processing system 106, including any sort of random access memory (RAM), read only memory (ROM), flash memory, registers, hard disks, removable disks, magnetic or optical mass storage, and/or the like. In an exemplary embodiment, the computer-executable programming instructions, when read and executed by the processing system 106, cause the processing system 106 to execute and perform one or more of the processes tasks, operations, and/or functions described herein.

Figure 2:
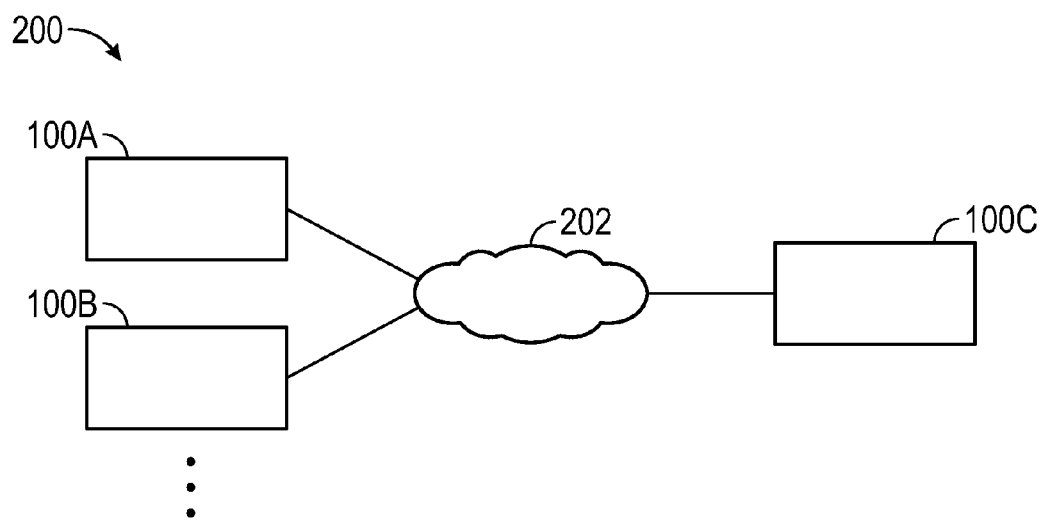
FIG. 2 is a conceptual block diagram depicting computing devices interconnected via a communication system.

As depicted in FIG. 2, multiple computing devices 100 may be interconnected in a communication system 200 via a communications network 204. Communications network 204 may be realized as any wired and/or wireless computer network that supports communications between computing devices 100 using one or more networking protocols and/or data communication methods, including, for example, IEEE 802.11 WiFi, Bluetooth, hypertext transport protocol (HTTP), transmission control protocol and/or Internet protocol (TCP/IP), and the like. In this regard, it should be understood that FIG. 2 is a simplified representation of a communications system presented for purposes of explanation and is not intended to limit the subject manner in any way.

Figure 3A:
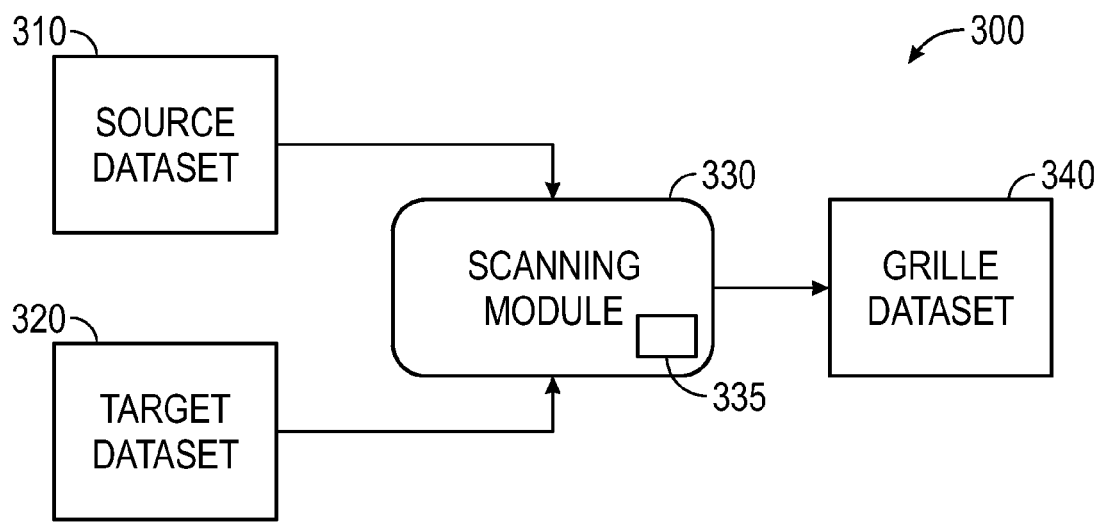
FIGS. 3A and 3B depict exemplary computer-implemented digital steganography systems.
Figure 3B:
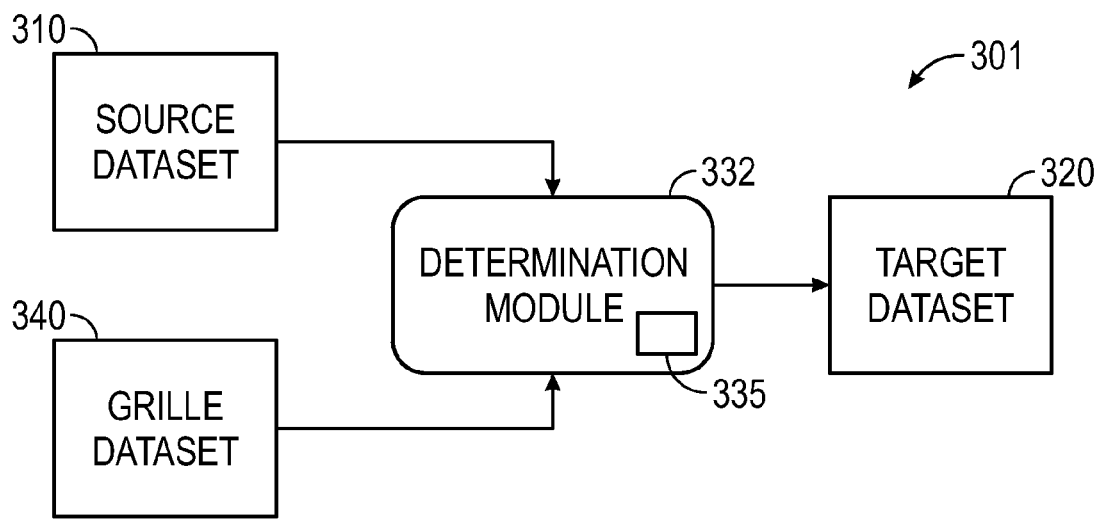

Referring now to FIG. 3A, a computer-implemented steganography system 300 in accordance with one embodiment generally includes a scanning module 330 configured to accept source dataset (or "source data") 310 as well as target dataset (or "target data") 320 and, via a predefined extraction method (embodied in module 335), produce grille dataset 340. Scanning module 330 includes any combination of hardware and software configured to map each of the target data elements in target dataset 320 with a corresponding source data element within the source dataset 310 in accordance with a predefined extraction method. The resulting grille data 340 (in conjunction with the source data 310 and module 335) thereby effectively "encodes" the target dataset 320. Accordingly, as shown in FIG. 3B, the process may be later reversed to reconstruct or otherwise determine the target data 320 via a determination module 332 that has access to both source dataset 310 and module 335. In some embodiments, scanning module 330 can function as determination module 332, or they are sub-modules of the same module.

In general, target dataset 320 is the key, password, secret message, or other digital object that needs to be concealed, and the source dataset 310 is the text or other digital object that is used to conceal the target dataset 320. Source dataset 310 and target dataset 320 each may be any form of computer-readable file now known or used in the future, such as a simple text file, a word-processing file, a digital image file (e.g., JPEG or GIF), a digital music file (e.g., MP3 or FLAC), a binary large object (BLOB) file, an executable file, or any other file capable of existing in binary form. As further described below, the predefined extraction method may require scanning through the source dataset 310 to find data elements (or bit sequences) that correspond to the data elements or bit sequences within target dataset 320. Accordingly, it is desirable that source dataset 310 be sufficiently large and diverse that it is capable of being used in conjunction with the expected length of target dataset 320. So, for example, a 10-byte source dataset would likely not be sufficient for encoding a 100-byte target dataset. At the same time, a 10 MB source dataset consisting of all null bytes would not be sufficient for encoding even a small target dataset.

Figure 4:
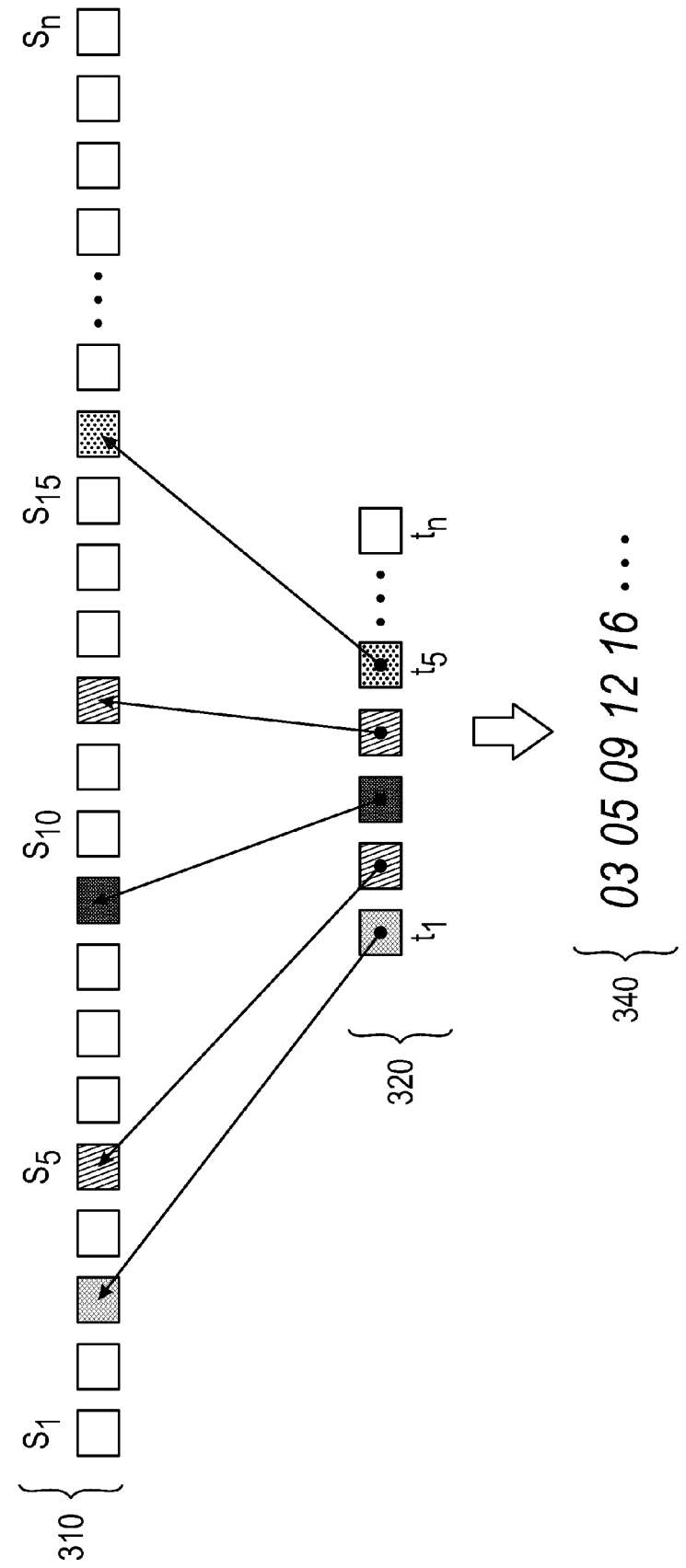
FIG. 4 depicts an exemplary method for producing a grille dataset.

Referring now to FIG. 4, which depicts a relatively simple and easy-to-comprehend example, the predefined extraction method (module 335 in FIG. 3A) may produce a grille dataset 340 comprising, for each target data element within target dataset 320, a corresponding indice within grille dataset 340 that indicates the position of the next occurrence of that target data element within source dataset 310 relative to some reference location (e.g., the beginning or end of the dataset). As illustrated, source dataset 310 includes an ordered series of n data elements $(s_1, s_2, \ldots, s_n)$, and target dataset 320 includes an ordered series of m data elements $(t_1, t_2, \ldots, t_m)$. Each data element may be any number of digital bits, and the "position" may refer to a particular bit, character, or location within the dataset. The indice will generally be an integer, but may be encoded or transformed in any suitable way. In many embodiments, n will be substantially greater than m, perhaps by an order of magnitude.

The goal of scanning module 330, then, is to sequentially consider each target data element within target dataset 320 and then inspect source dataset 310 to find the next occurrence that matches that target data element. If there is no match (i.e., if the source dataset is not sufficiently large), then a default value may be used or an error code or exception may be generated. The indice of the matching element is then added to grille dataset 340. Thus, in this simple example, target data element $t_1$ is found first at indice three (i.e., $t_1=s_3$), $t_2$ corresponds to $s_5$, $t_3$ corresponds to $s_9$, $t_4$ corresponds to $s_{12}$, and $t_5$ corresponds to $s_{16}$. The corresponding indices (of source dataset 310) is then the ordered set {3, 5, 9, 12, 16}. This set of indices can then be used to reconstruct target dataset 320, assuming that the extraction method is known.

As more concrete example, consider the case where the target dataset is the following character string:
HELLOWORLD
and the source dataset (with index reference numbers added for convenience) is:

```
THEQUICKBROWNFOXJUMPEDOVERTHELAZYDOG
123456789012345678901234567890123456
``` an extraction method that identified the first occurrence of each letter relative to the leftmost character in the source dataset would then produce a grille dataset 340 of {2, 3, 30, 30, 11, 12, 30, 10, 30, 22}.

In another embodiment, the extraction method is performed on a bit-level rather than an element (or character) level. That is, predefined extraction method is configured to produce a grille dataset comprising, for each target data element, a corresponding indice indicating the position of a specific bit within a bitwise representation of the source dataset, irrespective of the position of the source data elements. In such a case, the string "HELLOWORLD" and the source dataset above are represented by ASCII or another bit-wise code. The extraction method can then consider a three, four, or any number of bits at a time, ignoring the bitwise position of each of the source data elements.

In the above examples, the position within the source dataset is referenced from the beginning of the dataset (i.e., the leftmost element); however, in other embodiments, the position of the next occurrence is determined based on a location that is not the beginning of the source dataset, for example, from the end or at an arbitrary position in the middle of the source dataset.

Further, in some examples the position within the source dataset is referenced from a position that changes from element to element. Thus, the first position (i.e., indice) may be referenced from the leftmost element, the second from the rightmost character, the third from the leftmost character, and so on. In general, the entire predetermined extraction method may change from character to character or at any other suitable interval.

A variety of predetermined extraction methods may used in addition to those described above. For example, the source data set could be considered a two dimensional array of data (with bounds selected by the designer), and the position to be x, y coordinates. Such an embodiment would more closely represent a physical Cardano grille. A transformation may be applied to the dataset (for example, a reproducible encryption) that would cause the dataset to become more random, and thus provide a richer information set. Further, the target dataset to be hidden using the source dataset could drive the choice of an extraction method. For instance, if the target data is an image to be hidden within a JPG digital image file, it may be desirable to decode the source dataset image before determining the extraction method, as an encoded JPG has been regularized to some extent. False indices could be placed into the extraction data to randomize it. In one implementation, particular bits of extraction data are randomly generated. The extraction method would then be responsible for determining which data is false and which has meaning.

In one embodiment, the scanning module 330 (FIG. 3A) is configured to encrypt the grille dataset to produce an encrypted grilled dataset. This encryption step provides an extra level of security and, in such a case, the recipient would of course require knowledge of the encryption algorithm to determine the target data 320. Any number of conventional encryption schemes known in the art may be used.

In another embodiment, the predefined extraction method is based in part on a key, PIN, or other information provided by a user. That is, while the examples above assume that the predefined extraction method is constant and known, in some embodiments the extraction method becomes "predefined" only after a key or other input is provided by the user creating the grille dataset 340.

In some embodiments, the grille dataset 340 is transmitted over a computer network (e.g., 202 in FIG. 2) to a remote computing device that has access to the predefined extraction method and the source dataset 310. The remote computing device may then determine the target dataset based on the source dataset 310 and the predefined extraction method. In such a case, the source dataset 310 may be present locally on the remote computing device, or may be available over a network (e.g., in cloud storage). In other embodiments, the source dataset 310 and the grille dataset 340 are transmitted to the remote computing device together (e.g., concatenated).

In some embodiments, the predetermined extraction method may be sensitive to changes in the source dataset 310. In this way, the predetermined extraction method may be used as a form of cyclic-redundancy check to detect tampering of the source dataset 310. In one embodiment, the extraction method could be defined as a cyclic-redundancy check (CRC) or other Hash algorithm. In such an embodiment, the resulting grille dataset is a hash value that is extremely sensitive to any change in the source data. In another example, consider the case where the target dataset and source dataset are identical. In this case any change to the source would clearly affect the target. Since the target dataset is based upon the source dataset, this extraction method is inherently sensitive to changes in the source data it can function as a change detector whenever the target is known in advance.

In accordance with various embodiment, the systems and methods described above are used in the context of a multi-tenant database system. More particularly, referring to FIG. 5, an exemplary multi-tenant system 500 includes a server 502 that dynamically creates and supports virtual applications 528 based upon data 532 from a common database 530 that is shared between multiple tenants, alternatively referred to herein as a multi-tenant database. Data and services generated by the virtual applications 528 are provided via a network 545 to any number of client computing devices 540, as desired. Each virtual application 528 is suitably generated at run-time using a common application platform 510 that securely provides access to the data 532 in the database 530 for each of the various tenants subscribing to the multi-tenant system 500. In accordance with one non-limiting example, the multi-tenant system 500 is implemented in the form of a multi-tenant customer relationship management (CRM) system that can support any number of authenticated users of multiple tenants. Data stored and/or transmitted between the various components of FIG. 5—for example, server 502 and client computing devices 540—may include source data 310, target data 320, and/or grille data 340 as depicted in FIGS. 3A and 3B. Similarly, scanning module 330 and extraction module 332 of FIGS. 3A and 3B may be implemented within one or more of server 502 and client computing devices 540.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. Tenants may represent customers, customer departments, business or legal organizations, and/or any other entities that maintain data for particular sets of users within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In some embodiments, the database 530 shares processing hardware 504 with the server 502, while in other embodiments, the database 530 is implemented using separate physical and/or virtual database server hardware that communicates with the server 502 to perform the various functions described herein.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to establish, generate, or otherwise facilitate the application platform 510 and/or virtual applications 528 and perform additional tasks, operations, functions, and processes herein. It should be noted that the memory 506 represents one suitable implementation of such computer-readable media, and alternatively or additionally, the server 502 could receive and cooperate with computer-readable media (not separately shown) that is realized as a portable or mobile component or platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 508. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multitenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user that initiated the request.

Figure 5:
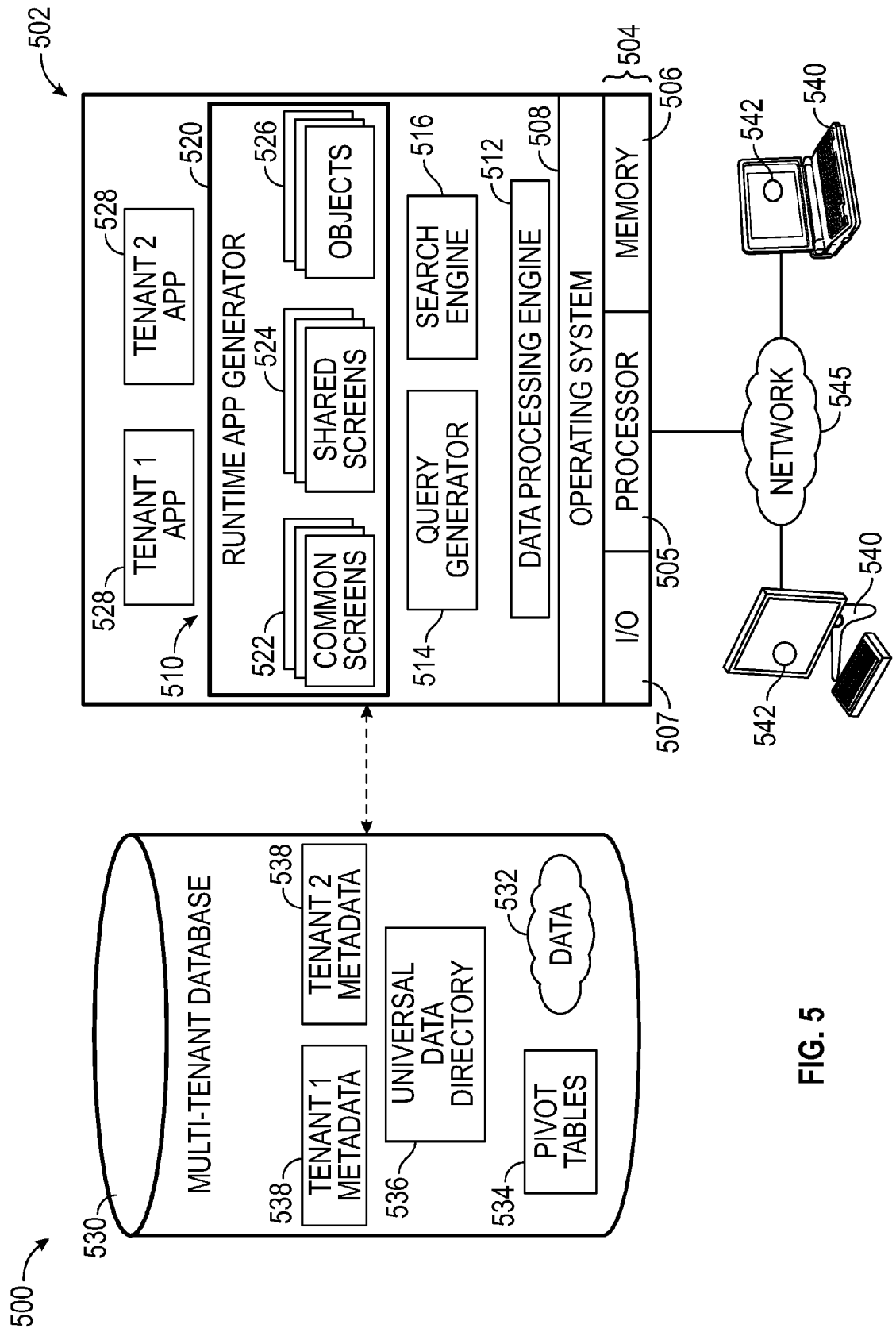
FIG. 5 depicts an exemplary multi-tenant database system.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In operation, developers use the application platform 510 to create data-driven virtual applications 528 for the tenants that they support. Such virtual applications 528 may make use of interface features such as tenant-specific screens 524, universal screens 522 or the like. Any number of tenant-specific and/or universal objects 526 may also be available for integration into tenant-developed virtual applications 528. The data 532 associated with each virtual application 528 is provided to the database 530, as appropriate, and stored until it is requested or is otherwise needed, along with the metadata 538 that describes the particular features (e.g., reports, tables, functions, etc.) of that particular tenant-specific virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530, as described in greater detail below. Typically, the user operates a conventional browser or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired. As described in greater detail below, the query generator 514 suitably obtains the requested subsets of data 532 from the database 530 as needed to populate the tables, reports or other features of the particular virtual application 528.

For the sake of brevity, conventional techniques related to computer programming, computer networking, data processing, cryptography, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components and modules (e.g., modules 330 and 332) shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented digital steganography method comprising:
   providing a processor with a plurality of target data elements each comprising a sequence of digital bits;
   providing the processor with a plurality of source data elements each comprising a sequence of digital bits; and
   using the processor to generate, according to a predefined extraction method, a mapping of each of the target data elements with a corresponding source data element, wherein the mapping comprises, for each target data element, a corresponding indice indicating the position of a next occurrence of that target data element within the plurality of source data elements relative to a reference location within the plurality of source data elements.

2. The computer-implemented digital steganography method of claim 1, wherein providing a plurality of target data elements each comprising a sequence of digital bits comprises:
   providing the processor with a target dataset having a binary form, the target dataset comprising: the plurality of target data elements.

3. The computer-implemented digital steganography method of claim 2, wherein providing a plurality of source data elements each comprising a sequence of digital bits and a specific start bit for each source data element comprises:
   providing the processor with a source dataset having a binary form, the source dataset comprising: the plurality of source data elements.

4. The computer-implemented digital steganography method of claim 3, wherein using the processor to generate, according to a predefined extraction method, a mapping of each of the target data elements with a corresponding source data element comprises:
   using the processor to map each of the target data elements in the target dataset with a corresponding source data element within the source dataset in accordance with the predefined extraction method to create a grille dataset.

5. The computer-implemented digital steganography method of claim 4, wherein each source data element comprises: the sequence of digital bits such that the source dataset are represented in a bitwise representation having a specific start bit for each source data element, and wherein the grill dataset comprises:
    a corresponding indice, for each target data element, indicating the position of the specific start bit within the bitwise representation of the source dataset, irrespective of the bitwise position of each of the source data elements.

6. The computer-implemented digital steganography method of claim 4, further comprising:
    using the processor to encrypt the grille dataset to produce an encrypted grilled dataset.

7. The computer-implemented digital steganography method of claim 4, further comprising:
    using the processor to transmitting the grille dataset over a computer network to a remote computing device, wherein the remote computing device has access to the predefined extraction method and the source dataset; and
    using another processor to determine the target dataset based on the source dataset in accordance with the predefined extraction method.

8. The computer-implemented digital steganography method of claim 1, wherein the predefined extraction method is based information provided by a user.
    a corresponding indice, for each target data element, indicating the position of the next occurrence of that target data element within the source dataset.

9. The computer-implemented digital steganography method of claim 8, wherein the position of the next occurrence is determined based on a location that is not the beginning of the source dataset.

10. The computer-implemented digital steganography method of claim 1, wherein the predefined extraction method is based in part on a key provided by a user.

11. The computer-implemented digital steganography method of claim 1, wherein the predefined extraction method comprises:
    scanning through the source data elements to find ones of the source data elements that correspond to the target data elements.

12. The computer-implemented digital steganography method of claim 11, wherein a target dataset comprises the plurality of target data elements and wherein scanning comprises:
    sequentially considering each target data element to find a next occurrence within the plurality of source data elements that matches that target data element, and wherein mapping comprises:
    adding an indicie to a grille dataset for each match between a target data element and one of the source data elements to generate a set of indices that can be used to reconstruct the target dataset.

13. The computer-implemented digital steganography method of claim 1, wherein the predefined extraction method is used as a cyclic-redundancy check to detect tampering of a source dataset that comprises the plurality of source data elements.

14. The computer-implemented digital steganography method of claim 1, wherein the predefined extraction method allows the plurality of target data elements to be reconstructed using the source dataset, and wherein:
    a grille dataset comprises the mapping,
    a source dataset comprises the plurality of source data elements,
    a target dataset comprises the plurality of target data elements, and
    wherein the grille dataset and source dataset are used to conceal the target dataset to any recipient that does not have access to the source dataset and the predefined extraction method, wherein the source dataset is not modified to conceal the target dataset.

15. The computer-implemented digital steganography method of claim 1, wherein one or more of the source data elements and the target data elements are digital image files.

16. The computer-implemented digital steganography method of claim 1, wherein one or more of the source data elements and the target data elements are digital music files.

17. The computer-implemented digital steganography method of claim 1, wherein one or more of the source data elements and the target data elements are binary large object (BLOB) files.

18. The computer-implemented digital steganography method of claim 1, wherein one or more of the source data elements and the target data elements are executable files.

19. A computing device comprising a processing system and a memory, wherein the memory comprises computer-executable instructions that, when executed by the processing system, cause the computing device to:
    read a plurality of target data elements, wherein each target data element comprises: a sequence of digital bits;
    read a plurality of source data elements, wherein each source data element comprises: a sequence of digital bits; and
    generate, according to a predefined extraction method, a mapping of each of the target data elements with a corresponding source data element, wherein the mapping comprises, for each target data element, a corresponding indice indicating the position of a next occurrence of that target data element within the plurality of source data elements relative to a reference location within the plurality of source data elements.

20. The computing device of claim 19, wherein the computer-executable instructions that, when executed by the processing system, cause the computing device to:
    read a target dataset having a binary form, the target dataset comprising: the plurality of target data elements.

21. The computing device of claim 20, wherein the computer-executable instructions that, when executed by the processing system, cause the computing device to:
    read a source dataset having a binary form, the source dataset comprising: the plurality of source data elements.

22. The computing device of claim 21, wherein the computer-executable instructions that, when executed by the processing system, cause the computing device to:
    map each of the target data elements in the target dataset with a corresponding source data element within the source dataset in accordance with the predefined extraction method to create a grille dataset.

23. The computing device of claim 22, wherein each source data element comprises: the sequence of digital bits such that the source dataset are represented in a bitwise representation having a specific start bit for each source data element, and wherein the grill dataset comprises:
    a corresponding indice, for each target data element, indicating the position of the specific start bit within the bitwise representation of the source dataset, irrespective of the bitwise position of each of the source data elements.

24. The computing device of claim 22, wherein the computer-executable instructions that, when executed by the processing system, cause the computing device to:
  encrypt the grille dataset to produce an encrypted grilled dataset.

25. The computing device of claim 22, wherein the computer-executable instructions that, when executed by the processing system, cause the computing device to:
  transmit the grille dataset over a computer network to a remote computing device that has access to the predefined extraction method and the source dataset, wherein the predefined extraction method is based in part on a key provided by a user.

26. The computing device of claim 19, wherein the predefined extraction method is based information provided by a user.

27. The computing device of claim 26, wherein the position of the next occurrence is determined based on a location that is not the beginning of the source dataset.

28. A method of encoding a plurality of target data elements, the method comprising:
  using a processor to access a plurality of source data elements, wherein each source data element comprises:
    a sequence of digital bits; and
  using the processor to encode the plurality of target elements into a grille dataset, wherein the grille dataset includes a plurality of indices configured to map each of the target data elements with a corresponding source data element in accordance with a predefined extraction method, and wherein the mapping comprises, for each target data element, a corresponding indice indicating the position of a next occurrence of that target data element within the plurality of source data elements relative to a reference location within the plurality of source data elements.

* * * * *